United States Patent [19]

Fogg et al.

[11] Patent Number: 4,567,919
[45] Date of Patent: Feb. 4, 1986

[54] CONTAINER FILLING MACHINE AND PROCESS

[75] Inventors: Michael T. Fogg; Paul L. Propst, both of Holland, Mich.

[73] Assignee: Fogg Filler Company, Holland, Mich.

[21] Appl. No.: 530,365

[22] Filed: Sep. 8, 1983

[51] Int. Cl.[4] .............................................. B65G 33/06
[52] U.S. Cl. ........................................ 141/1; 53/471;
156/DIG. 9; 141/145; 198/625
[58] Field of Search ................... 141/1, 144, 145, 146,
141/147, 148, 149, 150, 152, 180; 198/461, 625;
53/471; 156/DIG. 9

[56] References Cited

U.S. PATENT DOCUMENTS

| 1,073,067 | 9/1913 | Ayars | 141/150 X |
| 1,313,301 | 8/1919 | Kiefer | 141/147 X |
| 2,600,285 | 6/1952 | Von Hofen | 141/152 X |
| 2,637,478 | 5/1953 | McGihon | 141/150 X |
| 2,794,533 | 6/1957 | Galloway | 141/145 X |
| 3,036,624 | 5/1962 | Carter | 198/461 X |
| 3,054,496 | 9/1962 | Carter | 198/625 X |
| 3,087,517 | 4/1963 | Magnuson et al. | 141/1 |
| 3,168,123 | 2/1965 | Pellerino et al. | 141/147 |
| 3,426,812 | 2/1969 | Brinkley et al. | 141/147 X |
| 4,053,003 | 10/1977 | Ferrero et al. | 141/144 |

FOREIGN PATENT DOCUMENTS

| 57949 | 2/1912 | Switzerland | 141/148 |
| 513260 | 10/1939 | United Kingdom | 141/145 |

Primary Examiner—Stephen Marcus
Assistant Examiner—Mark Thronson
Attorney, Agent, or Firm—Gordon W. Hueschen

[57] ABSTRACT

The invention comprises a turret type container-filling machine in which the containers are advanced to and from filling position by a continuous belt and in which the containers are metered into filling position by a pair of parallel screws shaped to engage and hold the container while the filling spout of the filling machine is being lowered to the container mouth. The containers are exited along a curved portion of the track which is canted toward the center of its curvature at an angle such that gravity neutralizes the centrifugal force engendered by the containers traveling that curvature.

20 Claims, 4 Drawing Figures

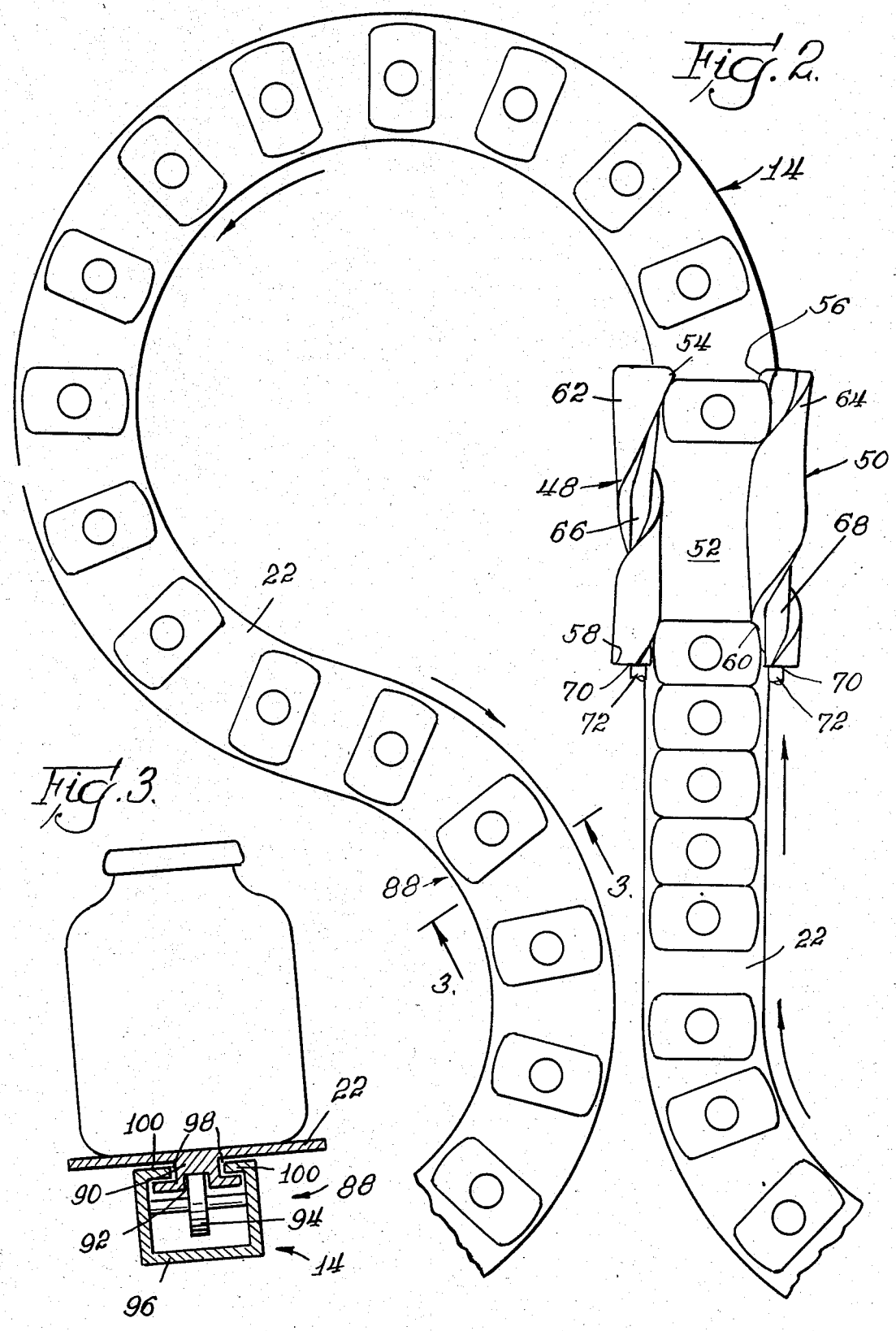

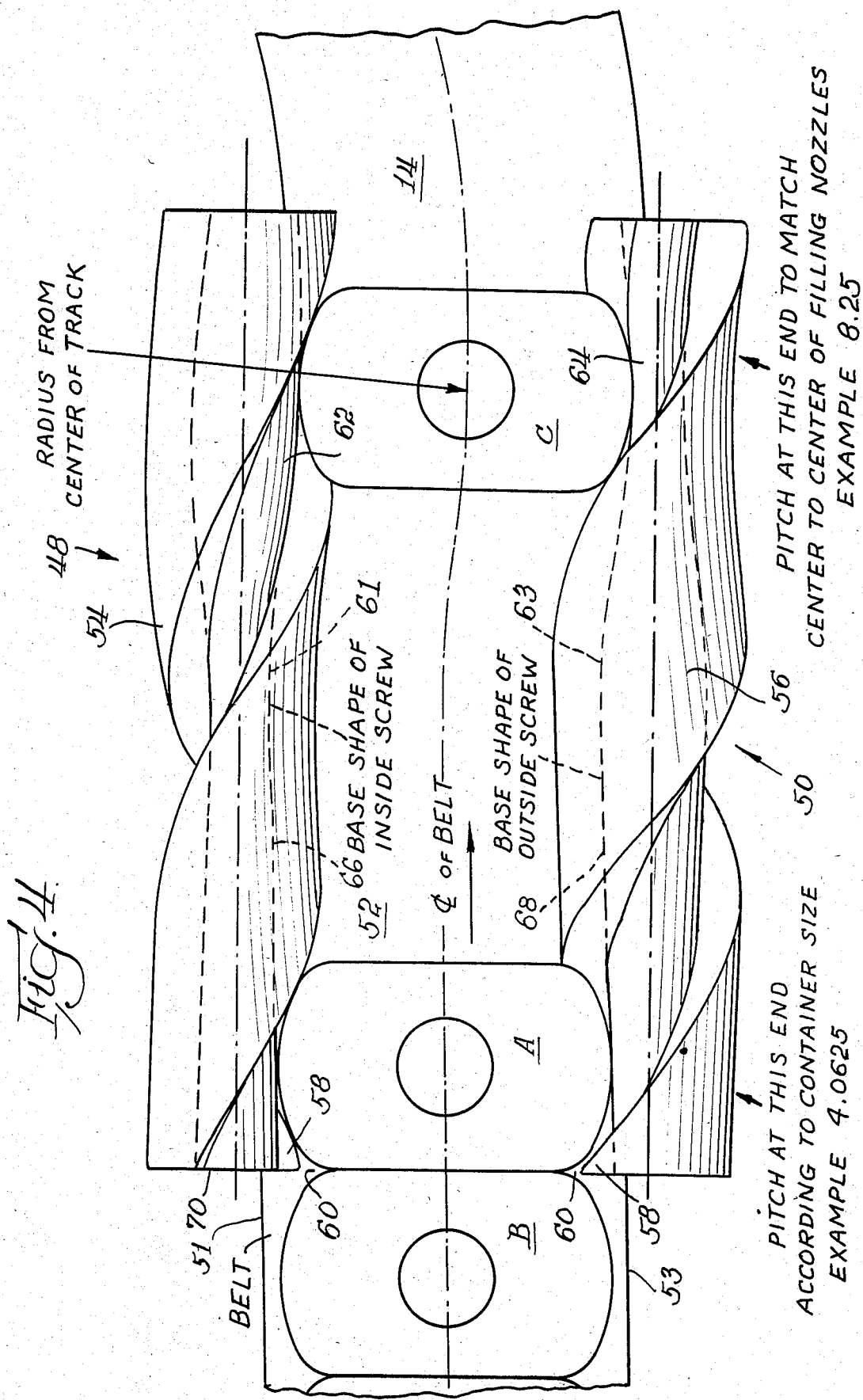

CONTAINER FILLING MACHINE AND PROCESS

BACKGROUND OF THE INVENTION

1. Field of the Invention

The invention relates to a machine and a process for performing an operation on each of a series of objects, and is particularly directed to a container filling machine and process. More particularly, the invention relates to improvements in apparatus and process in which operating means such as filling spouts, are arranged to pass serially over and along a path, and objects, such as containers, are admitted to and moved along said path in unison with the operating means operated on by said operating means during the traverse along said path, and exited therefrom.

2. Prior Art

Liquid filled containers have traditionally been handled and filled on rotary filling machines in which the containers to be filled file serially onto and along a circular track of a suitable carousel having filling spouts adapted for insertion into the mouths of the containers as they come to the proper place on the track. In one such device, see for example U.S. Pat. No. 3,589,414, the containers are fed to a star wheel which feeds them onto a circular carousel in synchronization with spouts where they are advanced to a second star wheel which exists them. The containers are fed to the first star wheel by means of a screw. A similar construction is illustrated in U.S. Pat. No. 3,559,702 where containers are fed by a screw or worm to a star wheel which meters them onto the carousel. In one patent, the containers are elevated to the filling spouts whereas, in the other, the filling spouts are lowered onto the containers. The screw in one of the patents has a uniform pitch, whereas that in the other increases from the inlet end to the outlet end, but in the width of the groove is constant. In both, however, the worm or screw is utilized to advance the containers to the star wheel which effects metering of the containers in synchronization with the filling spouts.

In U.S. Pat. No. 3,168,123, the track is made up of a continuous flexible belt and the containers are fed onto the belt by a star wheel operating in synchronism with the spouts. As in U.S. Pat. No. 3,589,414, the spouts are lowered into the containers.

Devices of the type described have the disadvantage that they are limited in the speed at which they can be operated because no satisfactory control of containers is maintained during the insertion of the filling spout thereinto. When the devices are speeded up, centrifugal force can easily cause the mouth of the container to rock or spin out of alignment with the filling spout. It has been proposed heretofore to provide guide rails for this purpose, but this is not always a satisfactory solution to the problem, particularly where bottles of irregular shape are to be filled. Similarly, the exiting of filled containers presents a similar problem, especially where a flat, continuous belt is employed, as in U.S. Pat. No. 3,168,123 because, when the filled containers move along the curved portion of the belt after the spouts are removed, problems sometimes arise, especially in wide-mouth containers, due to sloshing of the liquid therein.

OBJECTS OF THE INVENTION

It is an object of the invention, to provide a new and improved machine and process for performing an operation on each of a series of objects, (e.g., containers) while they are being moved along a path. It is a further object of the invention to provide a new and improved container filling machine and process. Still a further object of the invention is to provide for precise and accurate alignment of the object (e.g., container) with the operating means (e.g., filling spout) during engagement of the two. It is a further object of the invention to minimize or prevent sloshing in filled containers during their exit from the predetermined path. Further objects of the invention are to avoid the disadvantages of the prior art and to obtain such advantages as will be obvious to those skilled in the art or as will become apparent as the description proceeds.

SUMMARY OF THE INVENTION

One form of the invention embodies an improvement in a machine for performing an operation on each of a series of objects comprising means for moving said objects serially along a curvilinear portion of a path; performing means for performing the desired operation on said objects arranged to pass serially over and along said curvilinear portion in unison with said objects; admitting means for serially admitting objects to said curvilinear portion and means for moving said objects and said performing means in unison along at least a substantial portion of said path inclusive of said curvilinear portion, said admitting means, and an exiting means; which improvement comprises:

metering means for metering the admission of said objects to said path so that an object is admitted to said curvilinear portion at the same time that a performing means is over the so-admitted object;

move-inducing means for inducing said performing means to move into operational engagement with the object under it during its traverse along said curvilinear portion; and, object-engaging and holding means for engaging and holding an object under said performing means as it travels along said curvilinear path, at least until the performing means operationally engages said object.

Another aspect of the invention embodies an improvement in a process for performing an operation on an object in which a series of said objects are serially admitted to and moved along a path and a series of performing means are moved along said path above said objects in unison therewith over a portion of said path; which improvement comprises:

metering successive objects onto a curvilinear portion of said path;

causing said objects and said performing means to move in unison along said curvilinear portion;

engaging and holding each successive object under a performing means while the object and said performance means are traversing said curvilinear portion in unison over at least a portion thereof;

moving each said performing means in succession in operational engagement with the object moving in unison with it while the objects are so engaged and held and are moving along at least a portion of said curvilinear portion.

A still further aspect of the invention embodies improvements in a container-filling machine, and also to the corresponding process, for filling each of a series of containers comprising means for moving said containers along a curvilinear portion of a path; filling means for filling said containers arranged to pass serially over and along said curvilinear portion in unison with said containers; filling spouts arranged to pass serially over and along a loop-shaped path in unison with said objects; admitting means for serially admitting containers to said curvilinear portion; and means for moving said containers and said spouts in unison along at least a substantial portion of said path inclusive of said curvilinear portion and said admitting means up to an exiting means; characterized in that said path, including said admitting means and said exiting means, comprises a continuous, flat, moving belt, and in that the portion of said belt which forms said exiting means merges with said belt in a smooth curve forming a part of an S-curve, and in that said smooth curve is canted toward its center of curvature at an angle such that gravity neutralizes the centrifugal force engendered by the container traveling said smooth curve.

It is to be understood that the invention is particularly directed to improvements in a filling machine and process but, that in its broader aspects, it comprises any machine or process in which an operation is performed on an object (e.g., container) by a performing means (e.g., filling spout) while the two are moved in unison along a path inclusive of a curvilinear portion, and in which the objects (e.g., containers) are admitted to said path, engaged, and held by the admitting means during the travel of at least a part of said curvilinear portion and at least when said performing means (e.g., filling spout) is brought into engagement with the object (e.g. container) under it.

Advantageously, one or more additional features are included in which said metering means bridges the junction of the admitting means and said curvilinear portion and comprises a screw having at the inlet end, a pitch which corresponds substantially to the size of the object (e.g., container) and, at the outlet end, a pitch which corresponds substantially to the spacing between successive performing means (e.g., filling spouts); in which said objects (e.g., containers) are moved along by a continuous, flat, moving belt and the threads of said screw acting to hold the objects (e.g., containers) back so that successive objects (e.g., containers) reach said path in unison with the corresponding successively-advancing performing means (e.g., filling spouts); in which said screw is opposed to a channeling member to form a channel in which said objects (e.g., container) is engaged by said screw, advanced along said channel, metered onto said path, and held under a performing means (e.g., filling spout) at least until it is brought into engagement with the object (e.g., container); in which said channeling member is a second screw parallel to and complementary to the first screw; in which the threads of said screws are of uniform depth from the inlet end to the outlet end; and in which the screws rotate in the same direction, whereby said threads engage the forward sides of said objects (e.g., containers), the threads of one screw engaging the objects (e.g., containers) above the plane of the axes of said screws and the threads of the other screw engaging the objects (e.g., containers) below said plane; in which said object- (e.g., container) engaging and holding means comprise portions of said channeling member and said screw which lap said curvilinear portion and are complementarily curved with a curvature corresponding to the curvature of said curvilinear portion, whereby the object (e.g., container) continues to be engaged over said curvilinear portion, at least until the operating means (e.g., filling spout) is brought into engagement with said object (e.g., container); in which said channeling member comprises a complementary screw disposed with its axis in parallel relation to that of the first-named screw; in which said screws have complementary, parallel, contoured surfaces, in which the portions of said contoured surfaces which lap the admitting means are rectilinear, and the portions that lap the curvilinear portion are curvilinear and have complementarily convex and concave curvatures which have curvatures corresponding to the curvature of said curvilinear portion; in which said rectilinear portions have complementary tapers, that of the inboard screw tapering down to the convex curvature and that of the outboard screw tapering up to the concave curvature; and in which the edges of the portion of said path under the rectilinear portion of said surfaces are rectilinear, and in which the centerlines of said screws are substantially parallel to the rectilinear edges of said path.

Advantageously, a continuous, flat, moving belt is used to move the containers and the portion of said belt forming said exiting means merges with said belt on a smooth curve forming an S-curve therewith, and the belt in said smooth curve is canted toward the center of its curvature at an angle such that gravity neutralizes the centrifugal force engendered by the containers traveling the curvature of the belt of said exiting means.

Still another aspect of the invention involves improvements in which objects (e.g., containers) are moved by means of a flat, continuous belt to and away from an operating (filling) station comprising a plurality of spaced performing means (e.g., filling spouts) arranged to move along said belt in unison therewith and which comprises indexing means for admitting said objects (e.g., containers) in unison with said performing means (e.g. filling spouts), in which improvements said indexing means comprises parallel screws which have threads adapted to engage successive objects (e.g. containers) until after a performing means (e.g., filling spout) has been brought into engagement with the object (e.g., container) under it, and means to rotate said screws at the same speed and in the same direction, whereby the threads on one screw engage the object (e.g., container) above the axis of that screw and the threads on the other screw engage the object (e.g., container) below the axis of the screw, the pitch of said screws increasing from the inlet end to the outlet end, thereby causing the objects (e.g., containers) to speed up as they approach the outlet providing a spacing between them corresponding to the spacing between the performing means (e.g., filling spouts).

Advantageously, the grooves of the screws have a uniform depth and width.

The invention is particularly useful in connection with a container-filling machine but can also be used in connection with a container-capping machine or any machine in which a series of objects are brought in succession to a station where an operation of some sort is performed thereon by a means (performing means) adapted to perform the desired operation on the object.

BRIEF DESCRIPTION OF THE DRAWINGS

FIG. 2 is a plan view of the track portion of FIG. 1;

FIG. 3 is a sectional view taken on line 3—3 of FIG. 2;

FIG. 4 is a detailed view of the discharge end of the screws.

DESCRIPTION OF THE PREFERRED EMBODIMENTS

Figure 1:
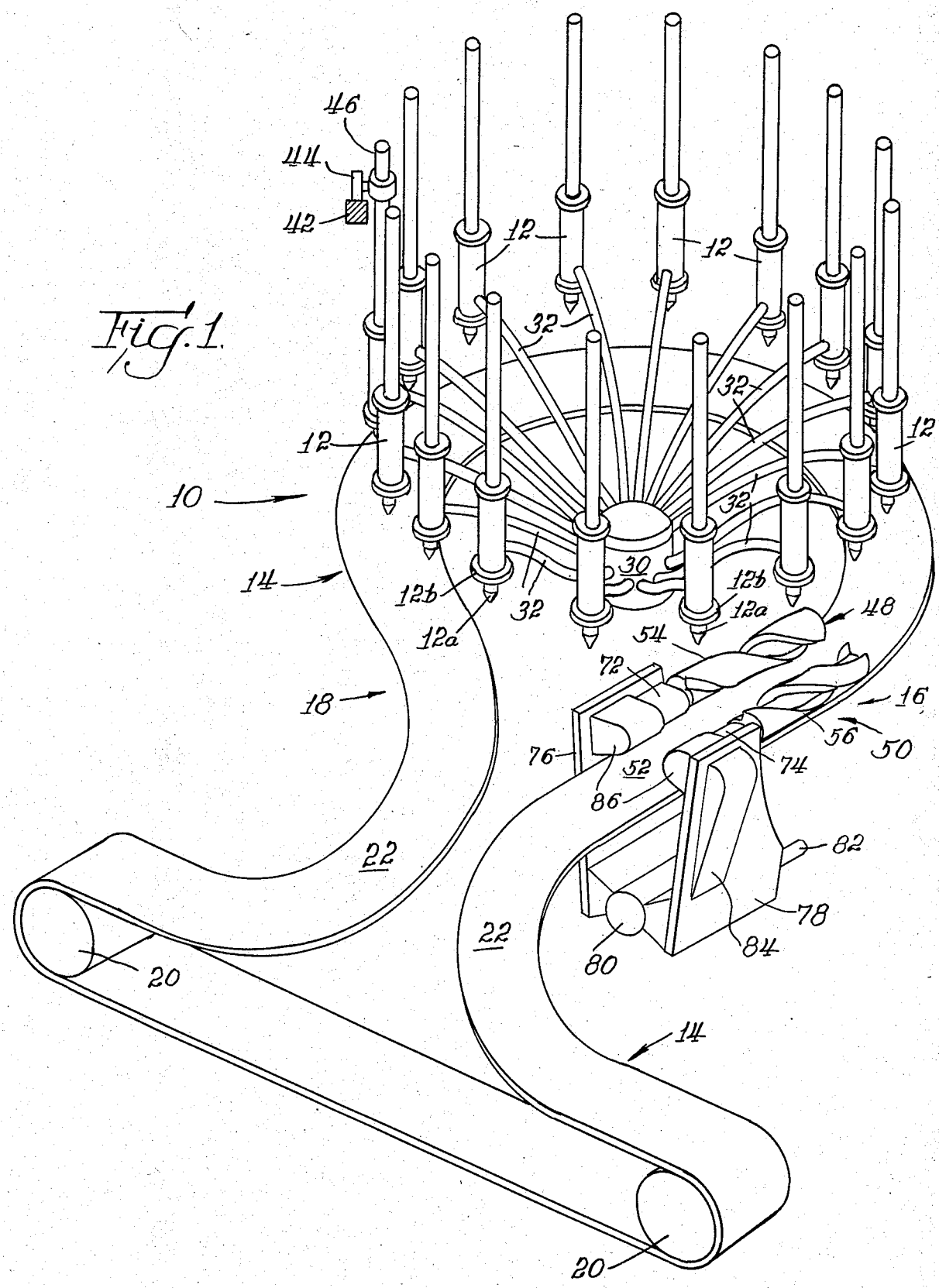
FIG. 1 is a stylized isometric view.

In FIG. 1 there is illustrated a stylized version of a container filling machine embodying prior art concepts, which comprise a turret 10 having filling spouts 12 arranged to pass over and along a loop-shaped track, advantageously a circular track or path 14.

Admitting means is provided at 16 to admit containers to the track 14. Exiting means is provided at 18 for exiting containers from the track. Drive means comprising the drive wheels 20 and a continuous belt 22 function to move the containers through the admitting means 16, along the track 14, and out the exiting means 18.

Fill effecting means (not shown) is connected with the several filling spouts 12 through a distributing valve 30. Liquid is fed from the distributing valve 30 through conduits 32 to the filling spouts 12.

The up and down operation of the filling spouts 12 is controlled by an annular cam 42 which extends circumferentially around the carousel, but which is illustrated herein simply by a stylized section thereof, as shown at 42. A cam follower 44 attached to the upright stems 46 of the filling spouts 12 rides on the cam and effects the lowering of the spouts at the proper place and time. Details of the construction and operation of the turret or carousel, including the annular cam 42, are not shown, as they are well known to those skilled in the art. See, for example, U.S. Pat. Nos. 3,168,123, and 3,589,414. The carousels disclosed in these patents can be mounted over the circular portion 14 of the loop-shaped track in lieu of the stylized form illustrated in FIG. 1.

The foregoing is illustrative of the general type of filling machines and processes of the prior art to which the improvements of the invention are particularly applicable.

Now referring particularly to these improvements, the admitting means 16 comprises a pair of parallel screws 48 and 50 forming a channel leading up to the circular track 14. The belt 22 has a rectilinear portion 52 coincident with said channel, which merges tangentially with the circular portion 14. The inlet portions of the screws 48 and 50 overlie the rectilinear portion whereas, the outlet ends of the screws overlie the circular portion of the track 14.

Containers are placed on the belt 22 and are carried thereby into the channel into engagement with the threads 54 and 56 of the screws 48 and 50, respectively. These threads hold the containers from advancing and let them advance as the screws are rotated.

Details of the construction of the screws can be better seen in FIGS. 2 and 4.

The pitch at the inlet end of the screws corresponds to the width of the containers so that, when the containers are advanced one container diameter, the leading edge or end 58 (FIG. 4) of the thread will bite into the angle 60 between the containers and thus separate the containers. Thereafter, the pitch of the screws increases so that, at the outlet end, the pitch corresponds to the spacing between the filling spouts and successive containers are released in unison with the spouts.

The rate at which the belt moves is the same as the rate of the rotation of the carousel so that the containers are maintained under the spouts once they are on the circular portion of the track and the rotation of the screws is at a rate such that, by the time the containers are released, they are moving at the same speed as the belt.

The screws turn in the same direction and at the same speed. Thus, as best seen in FIG. 2, looking in the direction of the arrows indicating movement, the screws rotate in a counterclockwise direction. By this construction, the portion of the thread 54 which rotates away from the container will engage it at a point above the plane of the centerlines of the screws, whereas the portion of the thread 56 which rotates away from the container will engage it at a point below the centerline plane. As long as the speed of the belt exceeds that of the containers, each container will be held in contact with the stated points of the threads 54 and 56. The containers thus will be supported at three points in three different elevations, namely, at the track 15, at the thread 56, and at the thread 54, thus providing excellent stability against inadvertent rocking of the container.

The screws have contoured surfaces corresponding to the rectilinear edges 51 and 53 of the rectilinear portion 52 and to the curvature of the circular (curvilinear) portion 14 of the track.

The portion of the screws 48 and 50 which lap the circular portion of the track 14 are shaped with complementary convex and concave curvatures 62 and 62, which are complementary to the curvature of the track at 14. By this construction, the containers are engaged by the screws until they are well onto the circular portion of the track 14 and held thereby, with the mouths of the containers properly in alignment with the spouts during the lowering of the spouts. The tip 12a of the spout first enters the mouth of the container and the collar 12b then closes the mouth of the container. Thereafter, the spouts will be lowered into the container, according to whether they are bottom filling or top filling spouts, in accordance with practices well known in the art.

The convex portion 62 has its curvature centered on the center of the carousel, as does the inner portion of the circular track 14. Similarly, the concave portion 64 also has its curvature centered on the center of the carousel, as does the outer portion of the circular track 14. Thus, the space between the convex portion 62 and concave portion 64 forms a circular path of precisely the same curvature as that of the circular track. In this way, the mouth of the container is maintained in alignment with the path of the spouts.

It will be understood, of course, that the screws may be made radially-adjustable, that is, in order to move the mouth of the containers in or out, with respect to the center of the carousel, to effect alignment with the path of the spouts, thus, making it possible to use the same infeed mechanism for containers having a mouth in their center, or those with the mouth thereof offset. It will be understood also, that the screws are replaceable, to accommodate different size containers or, to accommodate the same containers fed in with a different orientation. For example, containers, as shown, with the narrow side forward instead of the broad side forward. In such case, a screw with a greater initial pitch sufficient to span the wide dimension of the container will be necessary but, other than this, no change is needed.

The screws 48 and 50 have rectilinear portions 66 and 68, respectively, which are merged with the convex portion 62 and the concave portion 64, respectively by appropriate connecting curves 61 and 63 to form contoured surfaces. Portion 66 tapers rectilinearly down from the end 70 to the curve 61, whereas the corresponding portion of the opposite 68 tapers rectilinearly in the opposite direction up to the curve 63, but with the same degree of taper, so that the opposed edges of the tapered portions are parallel. They are also substantially parallel to the centerlines of the screws. By tapering the rectilinear portion 66 down to the curve 61, there is obtained a greater arc for the convex portion 62. Similarly, by tapering the rectilinear portion 68 up to the curve 63, there is obtained a larger arc for the concave portion 64. Thus, by virtue of these parallel tapers, the containers will be engaged by concave and convex portions of the screws over a somewhat longer distance than would be possible were the rectilinear portions not tapered as described.

As the threads 54 and 56 become progressively wider as the pitch increases (the grooves are of a constant width), the above-described contoured surface spirals around the screw and there is no continuous such surface linearly of the screw. Accordingly, the dotted lines showing the shape of the contoured surface is to be considered as if the threads were layered thereon, except for the area of the grooves.

The screws 48 and 50 form a channel for metering the containers onto the track. Container A moves into the channel with container B following along, as shown in FIG. 4. As the track brings container B up to the screws, the tip 58 of the thread 56 bites into the angle 60 between the two containers. This separates the two containers and allows container A to move on away from container B, ultimately up to the portion occupied by container C. Meanwhile, container B will be moved by the belt into engagement with the screws and the process will be repeated. As the pitch increases, the rate at which the containers move along the prescribed path gradually increases and, ultimately, when the containers near the end of the threads 54 and 56, they are moving at the same speed as the track 14 and the spouts 12. Thus, while the containers are still in the curvilinear section of the channel, that is, the section defined by the convex portion 62 and the concave portion 64, the spout is lowered into engagement with the container and will stay in engagement therewith after leaving the channel and until the filling operation is complete. After the containers leave the channel, there is no need for any engagement, other than that of the spout, to keep them from becoming disoriented.

The screws 48 and 50 are mounted in bearing blocks 72 and 74 mounted on support plates 76 and 78. These plates are hinged on the axis 80 so that one or both the screws 48 and 50 can be moved radially inwardly or outwardly, either independently, or in unison with the other screw. This way, the spacing between the screws can be adjusted and the centerline of the channel can be adjusted, or both. Suitable stop means, not shown, are provided for holding the support plates 76 and 78 in their adjusted positions.

The screws are driven by a prime mover, not shown, through shaft 82 coaxial with the central axis 80. Suitable gears and gear belts, not shown, are provided in the housings 84 and 86.

By virtue of maintaining the containers under positive engagement during the lowering of the filling spouts, the operation can be speeded up without danger of misalignment between the filling spouts and the container mouths. However, during exiting of the container, especially when tall, narrow containers are being filled or when widemouth containers are being filled, the speedup of the operation may cause the containers to tip if they are tall and narrow or the liquid therein to slosh if the mouth of the container is wide. In order to minimize or obviate this condition, the curved exit portion 88 of the track is canted, as shown in FIG. 3, toward its center of curvature at an angle such that gravity neutralizes the centrifugal force engendered by the containers traveling the curved exit portion 88. More particularly, the radial component of the gravity vector neutralizes the centrifugal force vector. To this end, the guide portion 90 of the belt 22 has a central groove 92 adapted to ride on a roller 94, that is to say, a series of such rollers supported by a base member 96, in a manner already well known in the art. If desired, the guide portion 90 can be provided with opposed side channels 98 adapted to receive guide members or rollers 100 mounted on said base 96, so that the degree of cant can be set and determined. If desired, the roller may be omitted and the track 22 allowed to slide freely on the base member 96.

There is thus provided a filling machine and process which can be operated at relatively high speeds without danger of misalignment of the containers and the filling spouts and without danger of tipping or sloshing during the exiting of the filled containers.

It will be understood, that while the invention has been illustrated with reference to a filling machine, in its broader aspects, it is applicable to other types of machines for capping containers or labeling the same or other objects to which it is desired to apply labels. Also, it is to be understood, that while the invention has been illustrated with regard to a filling machine in which the spouts are lowered into the containers, it is also applicable to such machines as disclosed in U.S. Pat. No. 3,559,702, in which the containers are lifted up to the filling spouts.

It is to be understood that the invention is not to be limited to the exact details of construction, operation, or exact materials or embodiments shown and described, as various modifications and equivalents will be apparent to one skilled in the art, and the invention is therefore to be limited only by the full scope of the appended claims.

We claim:

1. In a machine for performing a desired operation on each of a series of objects having a bottom and upstanding sides comprising:
   a path having a curvilinear portion;
   moving means for moving said objects horizontally, serially in spaced-apart relation along the curvilinear portion of said path;
   performing means for performing the desired operation on said objects;
   admitting means for serially admitting said objects to said curvilinear portion;
   means for moving said performing means in unison with said objects along at least a substantial portion of said curvilinear portion;
   metering means for metering the admission of said objects to said path so that an object is admitted to said curvilinear portion at the same time that a performing means is over the so-admitted object; and
   move-inducing means for inducing said performing means to move into operational engagement with the particular said object under it during its traverse along said curvilinear portion;
   the improvement which comprises:

a rectilinear portion of said path which merges tangentially with said curvilinear portion; and, object-engaging and holding means for engaging the upstanding sides of said object on opposite sides thereof and holding the so-engaged object under said performing means as it travels along said curvilinear path under said performing means, at least until the performing means operationally engages said object;

said admitting means being disposed partly over said rectilinear portion and partly over said curvilinear portion so that, during the admitting of said objects, they pass directly from said rectilinear portion onto said curvilinear portion.

2. A machine of claim 1, in which said metering means comprises a screw having, an inlet end with a pitch which corresponds substantially to the size of the object and an outlet end, with a pitch which corresponds substantially to the spacing between successive performing means.

3. A machine of claim 2, in which said screw is opposed to a channeling member to form a channel in which an object is engaged by said screw, advanced along said channel, metered onto said curvilinear portion, and held under an advancing performing means during at least a portion of its traverse of said curvilinear portion.

4. A machine of claim 3, in which said object-engaging and holding means comprises portions of said channeling member and said screw which lap said curvilinear portion and are complementarily curved with a curvature corresponding to the curvature of said curvilinear portion, whereby the object continues in unison with a performing means along said curvilinear portion, at least until the performing means is in operational engagement with the object under it.

5. A machine of claim 4, in which said channeling member comprises a complementary screw disposed with its axis in substantially parallel relation to that of the first-named screw, thus delineating inboard and outboard screws, in which said screws are disposed partly over the rectilinear portion of said path and partly over the curvilinear portion thereof and have contoured, parallel surfaces, in which the portions of said surfaces which are over the rectilinear portion are rectilinear, and the portions that are over the curvilinear portion are curvilinear and have convex and concave curvatures which have curvatures complementary to the curvatures of the curvilinear portion of said path which they are over.

6. A machine of claim 5, in which the rectilinear portions of said surfaces have complementary tapers, that of the inboard screw tapering down to the convex curvature and, that of the outboard screw tapering up to the concave curvature.

7. A machine of claim 6, in which said moving means has rectilinear edges which are complementary to the rectilinear portions of said surfaces and in which the centerlines of said screws are substantially parallel to the said rectilinear edges.

8. A machine of claim 2, in which the object is a container, the operation is filling the same, and the performing means is a filling spout; in which said moving means comprises a continuous, flat, moving belt having an S-curve in which a portion of said belt forms an exiting means and merges with another portion of said belt on a smooth curve forming a part of said S-curve; and in which the belt in the smooth curve portion thereof is canted toward the center of its curvature at an angle such that gravity neutralizes the centrifugal force engendered by the containers traveling said smooth curve.

9. A machine of claim 2, in which the object is a container, the operation is filling the same, the performing are successively advancing spouts, and said moving means comprises a continuous, flat, moving belt, in which said containers are moved along by said belt and the threads of said screw act to hold the containers back so that successive containers reach filling position in unison with the corresponding successively advancing spouts, in which said screw is opposed to a channeling member to form a channel in which said container is engaged by said screw, advanced along said channel, and held under an advancing spout at least until it is lowered to engage the container.

10. A machine of claim 9, in which said channeling member comprises a complementary screw disposed with its axis in substantially parallel relation to that of the first-named screw, thus delineating innermost and outermost screws, in which said screws are disposed partly over the rectilinear portion of said path and partly over the curvilinear portion thereof and have contoured, parallel surfaces, in which the portions of said surfaces which are over the rectilinear portion are rectilinear, and the portions which are over the curvilinear portion are curvilinear and have convex and concave curvatures which have curvatures complementary to the curvatures of the curvilinear portion of said path which they are over.

11. A machine of claim 10, in which the rectilinear portions of said screws have slight complementary tapers, that of the innermost screw tapering down to the convex curvature and, that of the outermost screw tapering up to the concave curvature, in which the portion of said belt under the rectilinear portions of said screws have opposed rectilinear edges, and in which the opposed edges of said rectilinear portions of said screws are substantially parallel to the rectilinear edges of said belt.

12. In a process for performing a desired operation on an object having a bottom and upstanding sides in which a series of said objects are serially admitted to and moved in spaced-apart relation along a horizontal path and a series of performing means are moved along said path above said objects in unison therewith over a portion of said path;

the improvement which comprises:

metering successive objects onto a curvilinear portion of said path from a rectilinear portion of said path which is tangential to said curvilinear portion;

causing said objects and said performing means to move horizontally in unison along said curvilinear portion;

moving each said performing means in succession into operational engagement with the object moving in unison with it; and engaging the upstanding sides of each successive object on the opposite side thereof and holding it under a performing means while the object and said performing means are traversing said curvilinear portion at least until the objects so engaged and held are operationally engaged by said performing means.

13. A process of claim 12, in which said objects are moved through a channel having a curvilinear portion which laps the curvilinear portion of said path and has means therein for engaging the upstanding sides of the objects and holding them against axial misalignment, the curvilinear portion of said channel corresponding in curvature to that of the curvilinear portion of said path.

14. A process of claim 13, in which said objects are moved to and away from said channel, along said path, and exited therefrom by a continuous, flat, moving belt, and in which movement of said objects in said channel is regulated by means of a screw.

15. A process of claim 14, in which said channel is formed by, and movement of the objects therein is regulated by, means of two parallel screws.

16. A process of claim 15, in which said screws have complementary, parallel surfaces, in which portions of said surfaces lap the rectilinear portion of said path and are rectilinear, and portions of said surfaces lap the curvilinear portion of said path and are curvilinear and have complementarily convex and concave curvatures which have curvatures corresponding to the curvature of said curvilinear portion.

17. In a container-filling machine for filling each of a series of containers comprising means for moving said containers along a curvilinear portion of a path, filling means for filling said containers arranged to pass serially over and along said curvilinear portion in unison with said containers; filling spouts arranged to pass serially over and along a loop-shaped path in unison with said objects;
    admitting means for serially admitting containers to said curvilinear portion;
    exiting means; and
    means for moving said containers and said spouts in unison along at least a substantial portion of said path inclusive of said curvilinear portion;
    admitting means for serially admitting containers to said curvilinear portion;
    the improvements characterized in that said path and comprises a continuous, flat, moving belt, and
    in that a portion of said belt forms said exiting means and merges with another portion of said belt in a smooth curve forming part of an S-curve and in which said smooth curve is canted toward its center of curvature at an angle such that gravity neutralizes the centrifugal force engendered by the container traveling said smooth curve without lateral support.

18. In a machine in which objects are moved by means of a flat, continuous belt to and away from a station where an operation is performed on the objects comprising a plurality of spaced performing means arranged to move along said belt in unison with said objects and which comprises indexing means for admitting said objects in unison with said performing means, the improvement in which said indexing means comprises:
    parallel screws which have threads adapted to engage the sides of successive objects until said station is reached and a performing means has been brought into contact with the object, and means to rotate said screws at the same speed and in the same direction, whereby the threads on one screw engage the object above the axis of that screw and the threads on the other screw engage the object below the axis of that screw, the pitch of said screws increasing from the inlet end to the outlet end, whereby the objects speed up as they approach the outlet end providing a spacing between them that corresponds to the spacing between the performing means.

19. A machine of claim 3, in which said channeling member is a second screw parallel to and complementary to the first screw, and in which the screws rotate in the same direction, whereby forward sides of said objects engage the threads of one screw above the plane of the axes of said screw and the threads of the other screw below said plane.

20. A process for operating a container-filling machine having filling spouts arranged to pass serially along and over a path in unison with containers to be filled;
    admitting means for admitting containers to said path;
    exiting means for exiting containers from said path;
    drive means for causing containers to move through said admitting means, about said path, and out said exiting means; and
    fill-effecting means, whereby each container is filled from a corresponding spout as it moves along said path between said admitting means and said exiting means;
    the improvement
    in which said containers are moved onto and along said path and exited from said path by means of a continuous, flat, moving belt, and
    in which the portion of said belt which forms the exiting means merges with another portion of said belt on a smooth curve forming a part of an S-curve and in which said smooth curve is canted toward its center of curvature at an angle such that gravity neutralizes the centrifugal force engendered by the container traveling said smooth curve without lateral support.

* * * * *

UNITED STATES PATENT AND TRADEMARK OFFICE
CERTIFICATE OF CORRECTION

PATENT NO. : 4,567,919
DATED : February 4, 1986
INVENTOR(S) : Michael T. Fogg and Paul L. Propst It is certified that error appears in the above-identified patent and that said Letters Patent is hereby corrected as shown below:

Col. 1, line 28; "exists" should read -- exits --
Col. 1, line 34; "onto" should read -- into --
Col. 1, line 37; delete "in"
Col. 3, line 29; after "e.g." insert a comma -- , --
Col. 4, line 46; "the" (second occurrence) should read -- that --
Col. 6, line 16; "15" should read -- 14 --
Col. 6, line 25; "62" (second occurrence) should read -- 64 --
Col. 7, line 1; "opposite" should read -- portion --
Col. 9, line 16; after "having" delete the comma " "
Col. 9, line 18; after "end" delete the comma ","
Col. 9, line 65; after "S-curve" insert a semicolon -- ; --
Col. 10, lines 6&7; after "performing" insert -- means --

Col. 10, line 7; after "advancing" insert -- filling --

Col. 11, line 37; the rest of the sentence beginning with "in" should be a new paragraph Signed and Sealed this Twenty-ninth Day of July 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,567,919

DATED : February 4, 1986

INVENTOR(S) : Michael T. Fogg and Paul L. Propst

It is certified that error appears in the above-identified patent and that said Letters Patent is hereby corrected as shown below:

Col. 11, line 37; delete "and"

Signed and Sealed this

Second Day of December, 1986

*Attest:*

DONALD J. QUIGG

*Attesting Officer*          *Commissioner of Patents and Trademarks*